United States Patent [19]

Knudsen et al.

[11] 4,406,760
[45] Sep. 27, 1983

[54] ELECTROLYTIC PROCESS FOR TREATING SULFURIC ACID STREAMS

[75] Inventors: George A. Knudsen, Scotch Plains; Charles Savini, Warren, both of N.J.

[73] Assignee: Exxon Research & Engineering Co., Florham Park, N.J.

[21] Appl. No.: 325,002

[22] Filed: Nov. 25, 1981

[51] Int. Cl.³ .............................................. C25B 3/02
[52] U.S. Cl. .................................... 204/130; 204/78; 204/79; 568/895; 568/899
[58] Field of Search ................... 204/131, 130, 78, 79, 204/149; 203/12; 568/895, 913, 899

[56] References Cited

U.S. PATENT DOCUMENTS

| | | | |
|---|---|---|---|
| 2,744,861 | 12/1951 | Thomas et al. | 204/72 |
| 2,793,180 | 7/1953 | Visnapuu | 204/130 |
| 2,793,181 | 7/1953 | Visnapuu | 204/130 |
| 2,793,182 | 8/1953 | Visnapuu | 204/130 |
| 2,961,472 | 11/1960 | Welch et al. | 568/899 |
| 3,616,337 | 8/1968 | Mather, Jr. | 204/130 |
| 3,917,521 | 10/1974 | Clarke et al. | 204/149 |
| 4,085,016 | 10/1976 | Janjua et al. | 204/104 |

FOREIGN PATENT DOCUMENTS 45740 2/1940 Belgium .
586878 11/1959 Canada .

OTHER PUBLICATIONS

C. L. Mantell, *Electrochemical Engineering*, pp. 326-328, (4th Edition, 1960).
36 Chem. Abs. 2869$^8$, Belgium 437920, 1942.

*Primary Examiner*—R. L. Andrews
*Attorney, Agent, or Firm*—Jack B. Murray, Jr.

[57] ABSTRACT

An improved process is provided for treating spent sulfuric acid streams formed in the catalytic hydration of olefins to prepare alcohols, wherein the spent acid stream containing organo-sulfonic acid impurities is treated in an electrolysis zone under conditions sufficient to electrolytically oxidize at least a portion of said organo-sulfonic acid impurities to form partially oxidized organic compounds therefrom and thereby provide a treated sulfuric acid stream of increased thermal stability. The improved process permits continuous operation at levels of total organic carbon in the treated acid which would otherwise be unacceptable and minimizes the substantial operating problems associated with formation of heavy carbon deposits in the process equipment.

7 Claims, 2 Drawing Figures

ELECTROLYTIC PROCESS FOR TREATING SULFURIC ACID STREAMS

CROSS-REFERENCE TO RELATED APPLICATION

This application is related to our co-pending application, Ser. No. 324,782 filed Nov. 25, 1981, entitled "Process for Treating Sulfuric Acid Streams."

BACKGROUND OF THE INVENTION

1. Field of the Invention

This invention relates generally to the treatment of spent sulfuric acid streams formed in the manufacture of alcohols via the $H_2SO_4$ catalyzed hydration of olefins.

2. Description of the Prior Art

Large volumes of alcohols are produced annually by the catalytic hydration of olefins, in which the selected olefin feed is absorbed in a concentrated sulfuric acid stream to form the corresponding alkyl ester of the sulfuric acid. Thereafter, water is admixed with the ester-containing liquid to hydrolyze the ester and to form the desired alcohol which is then recovered, generally by stripping with steam or other heating fluid. There is thereby produced a diluted sulfuric acid stream which must, for economic reasons, be treated to concentrate it with respect to its $H_2SO_4$ content after which it is recycled to the absorption step.

Organic impurities in these various sulfuric acid streams accumulate due to this continuous acid recycle, and this accumulation results in the deposit of carbonaceous materials on the inner surfaces of process equipment. These carbonaceous deposits, which result from the thermal degradation ("coking") of the organic impurities, can foul equipment, and severely reduce the flow rate of liquids therethrough. Removal of these deposits is, therefore, periodically necessary and requires shutting down of the facilities and physical removal of these deposits, as by manually scraping the fouled surfaces. This involves considerable expense in manpower and plant down-time, and results in a significant loss of overall annual plant capacity. In addition, the carbonaceous deposits which are thus removed are waste materials which create still further expense, and attendant environmental problems, in the need to safely dispose of these materials.

Various methods have been developed for electrolytic regeneration of spent alkylation sulfuric acids, such as are disclosed in Canadian Pat. No. 586,878 and U.S. Pat. Nos. 2,744,861, 2,793,180, 2,793,181 and 2,793,182.

U.S. Pat. No. 3,917,521 claims an improvement in prior art processes for regeneration of spent alkylation acids employing a method of sulfurless electrolysis in which persulfate ions are either supplied externally or generated in situ to permit the use of Pt electrodes in the electrolysis.

U.S. Pat. No. 3,616,337 relates to an electrochemical process for purification and concentration of spent sulfuric acids. In electrolysis of spent alkylation acids, water is added in controlled amounts to dilute the water content to between 1 and 2 times that amount of water stoichiometrically required to react with the carbon present in the spent acid, based on the reaction equations disclosed by the patentee. The patent also suggests, but it gives no working embodiment of, the application of his electrochemical method to dilute spent sulfuric acids containing about 40 to 50% water and about 1 to 2% by weight of carbon (10,000 to 20,000 ppm carbon), obtained from the manufacture of isopropyl alcohol. However, the patentee indicates that these acids should be distilled prior to electrolysis to remove water which is present in excess of the patentee's required range of from 1 to 2 times stoichiometry. Since a 1 to 2 wt% carbon content would require from about 3 to 12 wt% water, according to the patentee's method the latter acids are required to be concentrated from the original 48 to 59 wt% sulfuric acid to a range of from 86 to 96 wt% sulfuric acid prior to electrolysis.

U.S. Pat. No. 4,085,016 is directed to electrolytic treatment to decolorize sulfuric acid streams which are formed from sulfur dioxide obtained in the roasting of sulfide ores. A portion of a concentrated sulfuric acid stream which contains from 1 to 200 ppm carbon as organic impurities is diverted, diluted with water, cooled to a temperature of from 5° to 20° C. and then electrolyzed to form a predetermined quantity of peroxosulfuric acids. The resulting stream is then returned to the main acid stream to oxidize the organic material therein. In accord with the patentees' required electrolysis temperatures, and cited by the patentees, is C. L. Mantell, *Electrochemical Engineering*, pages 326–328 (4th edition, 1960), in which both current efficiency and the yield of persulfuric acid ($H_2S_2O_8$) is shown to significantly decrease at electrolysis temperatures above 20° C., and the yield is said to be practically zero at 60° C., with the persulfuric acid being said to decompose as fast as it is formed.

Spent sulfuric acid streams produced in different processes differ widely in their impurity-content and in their critical process characteristics. Thus, the above methods are not readily adaptable for use in treating spent acid streams formed in dissimilar processes, such as in the hydration of olefins to prepare alcohols.

Belgian Pat. No. 437,920, as abstracted in 36 Chem. Abs. 2969[8] (1942) absorbed ethylene with $H_2SO_4$, diluted the extract liquid and then distilled to remove ethanol and subjected the resulting dilute acid to electrolysis in such a manner as to yield a more concentrated acid at the anode and a more dilute acid at the cathode. The concentrated acid was reused for ethylene absorption and the dilute acid was used to dilute the extract liquid.

SUMMARY OF THE INVENTION

According to the present invention, spent sulfuric acid streams, containing organo-sulfonic acid impurities formed in the hydration of olefins to prepare alcohols are treated in an electrolysis zone under conditions sufficient to electrolytically oxidize at least a portion of said organo-sulfonic acid impurities to form partially oxidized organic compounds therefrom and thereby provide a treated sulfuric acid stream of increased thermal stability, i.e., carbonaceous solids are formed, if at all, at a rate which is less than are formed in the untreated spent acid stream at a given temperature.

It has been surprisingly found that the fouling problems associated with the formation of carbonaceous deposits in processes for the sulfuric acid catalyzed hydration of olefins to produce alcohols are due to the presence in the spent sulfuric acid streams of chemically-reactive organo-sulfonic acid impurities which are formed as by-products in the hydration process and which are readily degraded to coke and tars at elevated temperatures, and that these fouling problems can be avoided or greatly minimized by the process of this invention wherein the organo-sulfonic acid impurities are partially oxidized. It has been unexpectedly found that the process of this invention provides a treated sulfuric acid stream having a greatly improved thermal stability and permits recycle of the treated acid stream, after concentration, to the hydration process while greatly decreasing the amount of carbonaceous deposits formed by the thermal decomposition of organic impurities in the acid.

DESCRIPTION OF THE ACCOMPANYING DRAWINGS

DETAILED DESCRIPTION OF THE INVENTION

According to the process of this invention, spent sulfuric acid streams obtained in the hydration of olefins are treated to avoid or substantially minimize equipment fouling problems associated with the deposition of carbonaceous impurities on internal process equipment. The process of this invention provides these improved acid streams without the need to dilute the streams before electrolysis, and can employ a wide range of temperatures, avoiding the need for cooling the spent acids prior to electrolysis.

Figure 1:
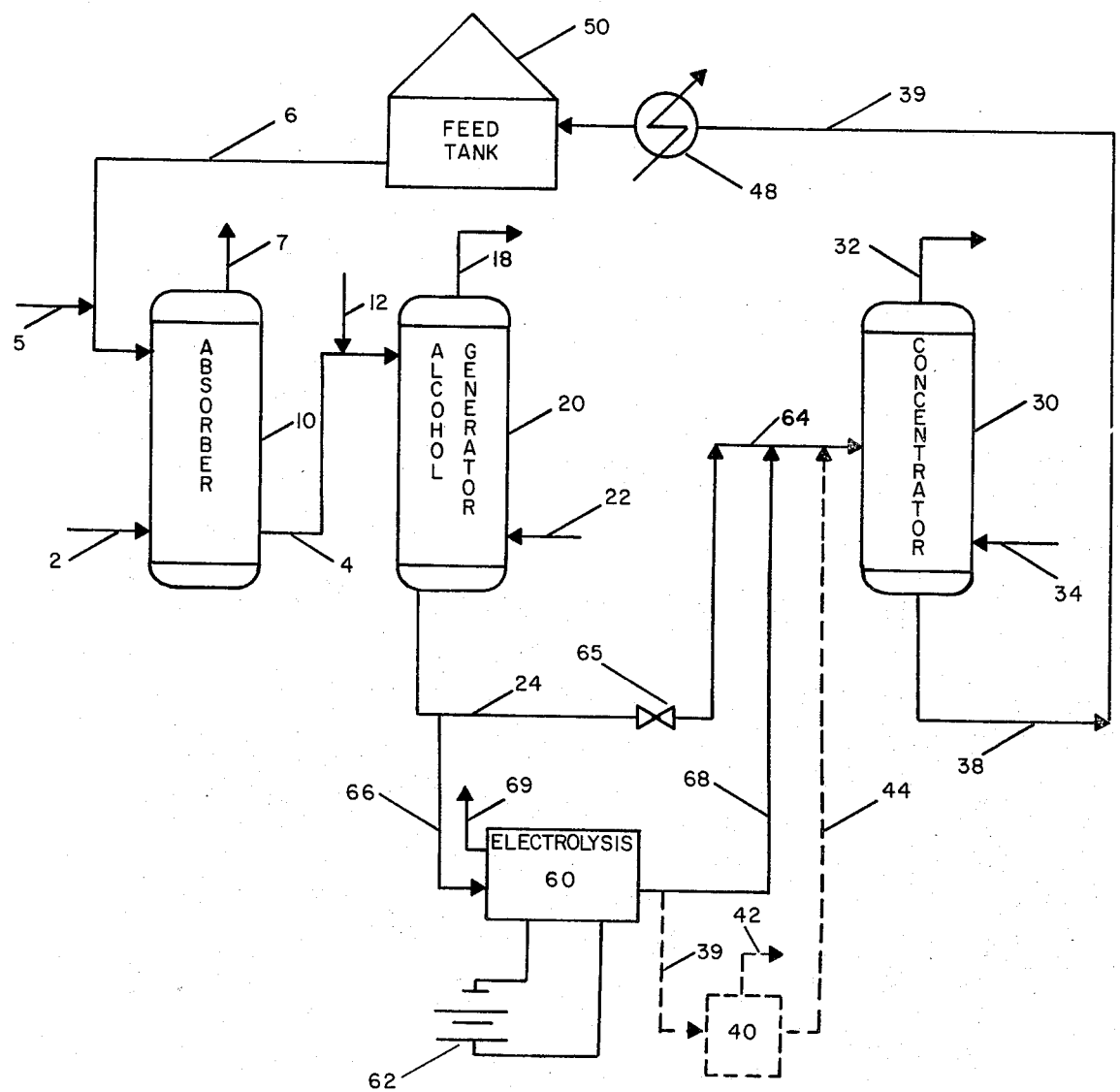
FIG. 1 is a diagrammatic illustration of one embodiment of the process of this invention.

The process of this invention can be illustrated by reference to the accompanying drawings wherein like numerals refer to the same or similar elements. Referring to FIG. 1, an olefin, for example an aliphatic olefin having from 2 to 8, and preferably from 2 to 4, carbon atoms per molecule (e.g., ethylene, propylene, butene, pentene and octene) is fed via line 2 to an absorber 10 wherein it is contacted with and absorbed (at least in part) by a concentrated sulfuric acid stream introduced via line 6, to form the corresponding alkyl ester of the sulfuric acid.

The olefins to be sulfated can be obtained from any available source, such as the destructive distillation of carbonaceous materials, but particularly from the cracking of petroleum hydrocarbons such as is practiced in the petroleum refining of mineral oils. The olefin employed in this invention can also be conventionally obtained by careful fractionation of cracked petroleum gases and is preferably substantially free of higher unsaturates, particularly diolefins such as butadiene, etc. Illustrative of olefins which can be employed are lower branched and straight-chained alkenes (i.e., alkenes of 2 to 6 carbon atoms), such as ethylene, propylene, the butenes and the like.

The sulfuric acid stream 6 which is used to sulfate the selected olefin feed is a concentrated acid stream whose precise acid concentration will vary depending on the olefin which is employed, the temperatures of reaction and other conditions. Generally, however, sulfuric acid stream 6 will contain from about 45 to 99 wt.%, and preferably from about 65 to 95 wt.%, sulfuric acid for sulfation of ethylene or propylene and from about 55 to 85 wt.%, and preferably from about 65 to 80 wt.%, sulfuric acid for reaction with butene or higher olefin feeds.

The temperature and pressure employed in absorber 10 will also vary depending on the olefin, the acid concentration and other factors. Generally, a temperature of from about 20° to 120° C. will be used, and the pressure will be sufficient to maintain the desired liquid phase in the absorption. Typically, for example, propylene is absorbed at a temperature of from about 90° to 110° C., and at a pressure of from about 100–400 psig.

As illustrated, the olefin and sulfuric acid streams are contacted in a counter-current fashion with the sulfuric acid stream being introduced into the upper portion of the absorber 10. Unabsorbed gases are withdrawn from the upper portion of absorber 10 via conduit 7 and can be recycled, if desired, to conduit 2 or can be subjected to conventional treatment, as with caustic solutions. A product stream, commonly termed the "extract," is withdrawn via line 4 from the lower portion of absorber 10 and contains the alkyl ester, e.g., di-ethyl sulfate in the instance in which ethylene is the olefin, and di(isopropyl)sulfate in the case of propylene sulfation. The concentration of the alkyl ester in extract stream 4 is not critical and can vary widely. For example, the extract generally contains 15 to 30 wt.% of total alkyl ester (mono- and di-alkyl ester) in the case of lower alkenes (e.g., propylene and butylene) absorption.

In the second step of the hydration process, water is added via line 12 to the extract in stream 4 for hydrolysis of the alkyl ester and to liberate the corresponding alcohol, e.g., isopropanol from di(isopropyl)sulfate. The manner in which the water and extract are contacted is not critical, and the art employs a variety of such methods, including (1) in-line addition of water to the extract (as illustrated), with a provision for a suitable length of conduit to provide adequate mixing and reaction time, and (2) contacting of the extract and water in a separate reaction vessel with agitation (not shown).

The amount of water which is added to the extract is also not critical and can vary widely. Generally, from about 0.3 to 1.0 parts by weight of water is added to the extract part by weight of alkyl ester in the extract. It is important not to add excessive water, since this only results in increased dilution of the extract and the excess water must subsequently be removed in the concentration step, to be discussed in more detail below.

The diluted extract thus formed generally contains from about 30 to 60 wt. % sulfuric acid, and more preferably from about 40 to 50 wt.% sulfuric acid, and is then passed via line 4 to distillation column 20, herein termed the "alcohol generator," wherein crude alcohol is recovered as an overhead product via line 18. The overhead alcohol product can then be passed to further conventional processing to produce alcohol of the required purity.

A bottoms product is withdrawn from alcohol generator 20 via line 24 and comprises a sulfuric acid stream which generally contains from about 40 to 55 wt. %, and preferably from about 45 to 50 wt. %, sulfuric acid.

Alcohol generator bottoms are passed via line 24 and 64 to distillation column 30, hereinafter termed the "acid concentrator," wherein this acid stream is distilled for removal of water as overheads (withdrawn via line 32) and to form a second bottoms product comprising a concentrated acid stream (withdrawn via line 38). These concentrated bottoms are generally cooled in an exchanger 48 and passed to storage 50 for ultimate recycle to the adsorption step via line 6, with the addition of make-up $H_2SO_4$ via line 5, if required.

According to the embodiment of this invention illustrated in FIG. 1, at least a portion of the alcohol generator bottoms, comprising an aqueous liquid containing from about 40 to 55 wt.% $H_2SO_4$, and organo-sulfonic acid impurities is passed via lines 24 and 66 to electrolysis zone 60 wherein the contaminated sulfuric acid stream is electrolyzed to form partial oxidation products of the organo-sulfonic acid impurities. The organo-sulfonic acid impurities are generally present in the alcohol generator bottoms 24 in an amount of at least about 500 ppm, usually at least about 700 ppm, more typically from about 9,000 to 30,000 ppm, and most typically from about 12,000 to 20,000 ppm, by weight. The alcohol generator bottoms to be treated by the process of this invention, can contain up to 65,000 ppm or more of the organo-sulfonic acid impurities.

The organo-sulfonic acid impurities generally contain from 2 to 16, more typically from 2 to 8, carbon atoms per molecule in the organic moiety and at least one, more typically 1 to 2, sulfonic acid moiety ($-SO_3H$) per molecule. When the organo-sulfonic acid impurity is represented by the formula $RSO_3H$, "R" can comprise members selected from the group consisting of alkyl, cycloalkyl, aryl, polynuclear aryl, alkenyl, alkynyl, alkaryl, aralkyl, heterocyclic, and derivatives thereof in which one or more carbon is substituted by hydroxy, keto, carboxyl, sulfato, mercapto or sulfono group.

When "R" is alkyl, the alkyl group can be branched or straight-chained and generally contains from 1 to 12 carbon atoms, and more usually contains from 1 to 6 carbon atoms. Examples of such alkyl groups are methyl, ethyl, isopropyl, pentyl, octyl and dodecyl. When "R" is cycloalkyl, the cycloalkyl group generally contains from 3 to 12 carbon atoms, and more usually contains from 4 to 8 carbon atoms. Examples of such groups are cyclopropyl, cyclobutyl, cyclohexyl, cyclooctyl and cyclododecyl. Illustrative "R" aryl groups are phenyl. When "R" is polynuclear aryl, the "R" group generally contains of from 2 to 4 aromatic rings. Examples of such polynuclear aryl groups are naphthenyl, anthracenyl, and phenanthrenyl. When "R" is alkenyl, the alkenyl group generally contains from 2 to 12 carbon atoms, and more usually from 2 to 6 carbon atoms. Exemplary of such alkenyl groups are ethenyl, butenyl, hexenyl and decenyl. When "R" is alkynyl, the alkynyl group will generally contain from 2 to 12 carbon atoms, and more usually from 2 to 6 carbon atoms. Exemplary of such alkynyl groups are ethynyl, butynyl and propynyl. When "R" is alkaryl, the aryl component generally consists of phenyl or tolyl and the alkyl component generally has from 1 to 12 carbon atoms, and more usually from 1 to 6 carbon atoms. Examples of such alkaryl groups are tolyl, m-ethylphenyl, o-ethyltolyl and m-hexyltolyl. When "R" is aralkyl, the aralkyl group generally consists of phenyl or alkyl-substituted phenyl as the aryl component and an alkyl component having from 1 to 12 carbon atoms and more usually from 1 to 6 carbon atoms. Examples of such aralkyl groups are benzyl, o-ethylbenzyl and 4-isobutyl benzyl. When "R" is heterocyclic, the heterocyclic group generally consists of a compound having at least one ring of 6 to 12 members in which one or more ring carbon atoms is replaced by oxygen or nitrogen. Examples of such heterocyclic groups are furyl, pyranyl, pyridyl, piperidyl, dioxanyl, tetrahydrofuryl, pyrazinyl and 1,4-oxazinyl. Illustrative of typical such impurities are alkenyl-sulfonic acids of 2 to 4 carbon atoms and hydroxy-substituted alkyl sulfonic acids of 2 to 4 carbon atoms and the like, and mixtures thereof. Exemplary of the hydroxy-alkyl sulfonic acids are $CH_3CH(OH)CH(CH_3)SO_3H$, $HOCH_2CH_2SO_3H$, $CH_3CH(OH)SO_3H$,

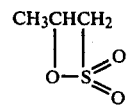

and the like. Illustrative of alkenyl-sulfonic acids are $CH_3CH=CHCH_2SO_3H$, $CH_2=CHSO_3H$, $CH_3CH=CHSO_3H$ and the like. The most typical organo moieties are alkenyl and hydroxyalkyl wherein the number of carbon atoms in each moiety correspond to the number of carbon atoms in the olefin introduced via conduit 2 to absorber 10.

The portion of the alcohol generator bottoms passed to zone 60 will vary depending on a variety of factors such as the initial impurity level of the acid, the desired degree of removal of the organo-sulfonic acids, and other factors. Generally, however, at least about 10 vol.%, preferably at least about 50 vol.%, and more preferably from about 90 to 100 vol.%, of the alcohol generator bottoms are passed to zone 60. In the case in which all of the alcohol generator bottoms are treated in zone 60, conduit 24 feeds only conduit 66 and not conduit 64. The portion of the bottoms passed to zone 60 can be varied as desired, as by means of valve 65 regulating flow through conduit 24 downstream of its intersection with conduit 66.

The spent sulfuric acid stream can be electrolytically treated in electrolysis zone 60 in a batchwise, continuous or semicontinuous manner. The conditions of temperature and pressure suitable in the electrolysis of the organo-sulfonic acid impurities can vary widely, but generally a temperature of at least about 20° C., more preferably from about 40° to 110° C., and most preferably from about 50° to 90° C., is employed. Temperatures outside of this range (e.g., up to 190° C. or above) can also be used. The pressure should be at least that which is sufficient to maintain the liquid to be electrolyzed in a liquid state at the selected temperature. Pressures of from 0 to 30 psig are entirely suitable, although pressures outside this range can also be used. The residence time of the spent sulfuric acid in zone 60 will range from 2 seconds to 3 hours, or more preferably, from about 10 seconds to one hour.

Any conventional electrolytic apparatus can be employed. Electrolysis zone 60 can therefore comprise one or more such electrolysis cells arranged in series or in parallel. The electrodes should be electrically conductive under the conditions of the electrolysis. The anode can comprise, for example, massive lead dioxide or supported lead dioxide, e.g., supported on graphite, zirconium, carbon, titanium, tantalum or other electrode support substrates, and can also comprise Pt or other noble metals or alloys containing the same, either as the metal or alloy itself or as coatings on conventional electrode substrates. The cathode can comprise hastelloy, Ti, Zr, Pb, steel or graphite, among others. The precise materials selected for use at the electrodes will depend on the rate of dissolution of the selected material, which in turn depends to a large degree on the conditions of the electrolysis. Most preferred is lead dioxide for the anode and steel for the cathode.

The electrolysis will generally employ a current density of from about 1 to 1,000 amp. per sq. ft., preferably from about 100 to 500 amp. per sq. ft. Also, voltage will be applied in electrolysis zone 60 generally within a range of from about 2 to 6 v, although higher or lower voltages can also be used. Of course, since voltage requirements increase as current density increases, the power requirement for electrolysis will increase as current density increases. Also, any dissolution of the anode during electrolysis which results in a change in the electrode dimensions will require an increase in the applied voltage, due to the smaller anode and to the increased distance between the electrodes, in order to maintain a given current density.

The distance between the electrodes in electrolysis zone 60 is not critical, and together with the selected applied voltage can be adjusted to provide the desired current density. Of course, at a given applied voltage, a decreasing distance between the electrodes reduces the amount of ohmic resistance between the electrodes offered by the sulfuric acid, which in turn reduces the power required to effect the desired electrolysis. However, the electrodes should be spaced sufficiently apart to avoid the formation of substantial quantities of bubbles, which impair the conductivity of the electrolyte and increase the power required to effect the desired electrolysis. The extent to which such bubbles contribute to a loss in electrolyte conductivity depends on a variety of factors, such as the size and quantity of the bubbles, the degree of turbulence in the electrolyte and other factors. Typically, this loss of conductivity can be decreased by increasing the liquid hourly space velocity of electrolyte flow through the cell, by stirring or other methods of dispersing the bubbles. It has been found that with current densities in the range of 50 to 200 amp per sq ft, separation distances of from about 0.25 to 0.5 in are preferred.

The electrolysis in zone 60 can also result in the formation of gaseous hydrogen and oxygen from some of the water present. These gaseous by-products can be removed from zone 60 via conduit 69.

Voltage source 62 supplies the required electrical current to zone 60 and is entirely conventional in its construction and operation. Preferably, voltage source 62 provides either direct current or pulsating direct current, with direct current being especially preferred.

By the above means, it has been surprisingly found that the organo-sulfonic acid impurities are converted to electrolytic oxidation products which are significantly more thermally stable than the organo-sulfonic acid impurities themselves. Thus, the treated spent sulfuric acid stream containing these oxidation products exhibits markedly reduced tendencies to form carbonaceous deposits in process equipment associated with the production and recovery of the alcohol product and the concentration and recycle of the sulfuric acid.

The precise electrolysis products formed will, of course, vary depending on the type of organo-sulfonic acid impurity, the conditions of electrolysis and other factors. Generally, however, these electrolysis products comprise a mixture of lower aliphatic carboxylic acids (e.g., acetic propionic, butyric acids), sulfuric acid, carbon monoxide, and carbon dioxide, in addition to unknown organic oxidation products formed, e.g., by carbon-carbon scissions in the molecules of the organo-sulfonic acid impurities.

At least a portion of these electrolysis products are substantially more volatile than the organo-sulfonic acid impurities themselves. Thus, the treated spent sulfuric acid stream containing the electrolysis products can be further treated to remove at least a portion of (and preferably a majority of) these more-volatile products, as by distillation or by flashing at reduced pressure. It has been surprisingly found that it is not necessary to remove the electrolysis products less volatile than the organo-sulfonic acids in order to achieve a more thermally stable sulfuric acid for olefin hydration.

In the embodiment of FIG. 1, the treated alcohol generator bottoms are withdrawn via line 68 from electrolysis zone 60 and passed to line 64 for introduction to concentrator 30 wherein the treated spent acid is contacted with a heating fluid, such as steam introduced via line 34, to remove water as an overhead product via line 32 and to form a concentrated sulfuric acid stream which can be withdrawn via line 38. The conditions of temperature and pressure within concentrator 30 are not critical and will vary widely depending on the alcohol stream treated. Thus, a temperature of from about 80° to 180° C., preferably from about 80° to 130° C., and a pressure of from about −15 to 100 psig, will generally be employed in the hydration of propylene or butylene.

The aqueous overhead vapors withdrawn via line 32 will also contain at least a portion of the electrolysis products which are fed to concentrator 30 and which vaporize under the temperature and pressure conditions employed in concentrator 30. The remaining organo-sulfonic acid impurities and higher boiling impurities, including any higher boiling electrolysis products, will remain in the concentrated acid withdrawn via conduit 38.

If desired, a portion or all of the effluent from electrolysis zone 60 can be passed via conduit 39 to a separate distillation zone 40 wherein the electrolysis products having boiling points lower than water, or which co-distill with water, are removed as overhead via conduit 42. The resulting liquids, now depleted of organic impurities more volatile than water, are then passed to conduit 64 for introduction into concentrator 30. In this embodiment, the aqueous overhead 32 from concentrator 30 contains decreased amounts of organic impurities and the amount of heating required in concentrator 30 is minimized.

Figure 2:
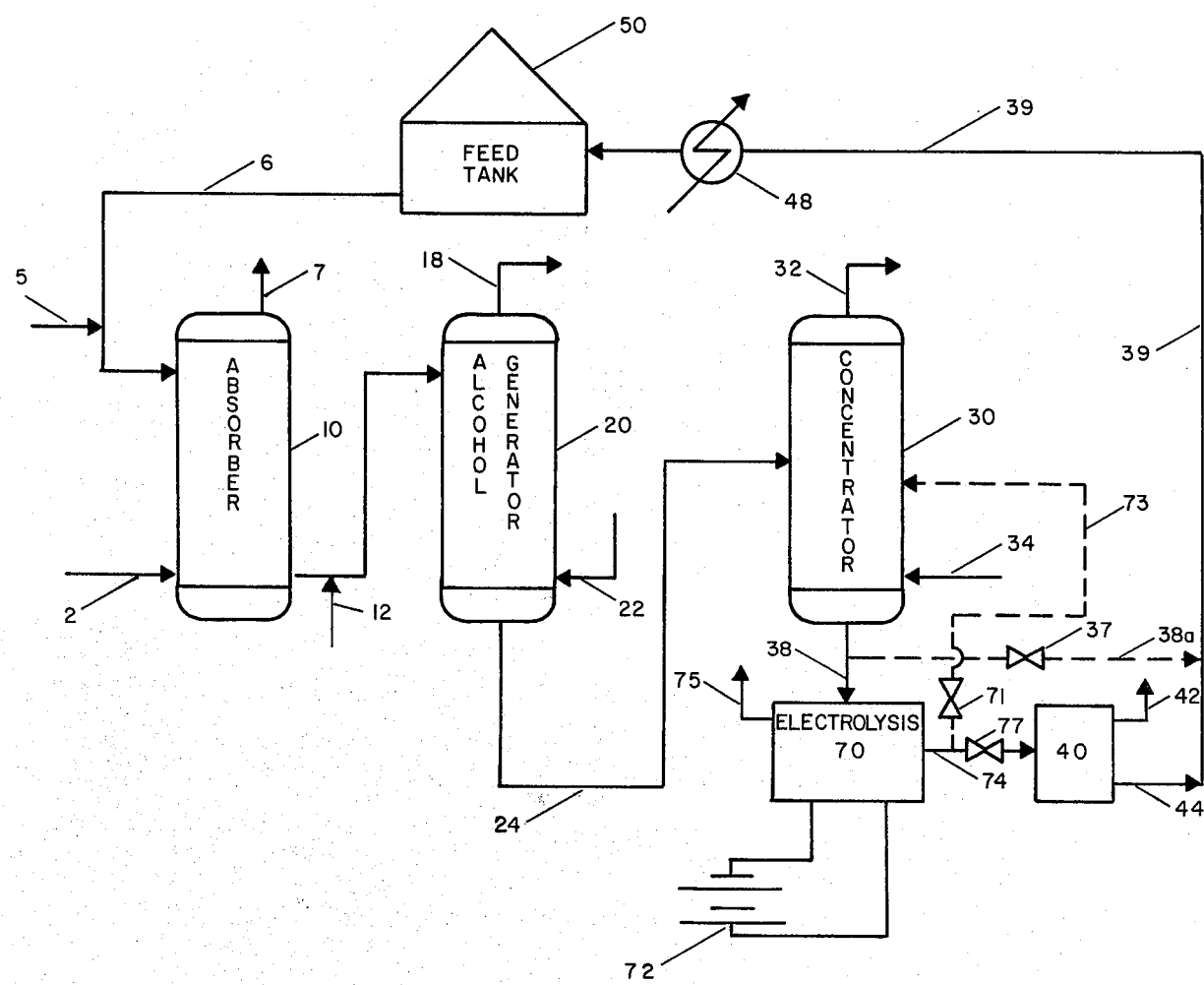
FIG. 2 is a diagrammatic illustration of a further embodiment of the process of this invention.

Referring now to FIG. 2, an embodiment of this invention is illustrated wherein the bottoms product from concentrator 30, comprising a more concentrated sulfuric acid, e.g. 50 to 85 wt % $H_2SO_4$, and containing at least about 1500 ppm, usually from about 10,000 to 30,000 ppm and more, and more typically from about 13,000 to 20,000 ppm of the organo-sulfonic acid impurities is withdrawn via conduit 38 and at least a portion thereof is passed to contacting zone 70 wherein such portion is electrolyzed as described above. A gaseous mixture of $H_2$ and $O_2$ is withdrawn via line 75, and liquid effluent is withdrawn from zone 70 via conduit 74 and passed to a separate distillation zone 40 wherein the volatile electrolysis products are removed as overhead via conduit 42, as described above. The resulting liquids, depleted of organic impurities more volatile than water, are then passed via line 44 to conduit 39 and can next be recycled, after cooling in heat exchanger 48 if desired, to vessel 50 as described above.

Optionally, a portion (or all) of the liquid effluent in conduit 74 can be recycled via conduit 73 to concentrator 30 wherein at least a portion of the volatile electrolysis products which were formed in zone 70 are vaporized and withdrawn with the overheads via conduit 32. To the extent that such a recycle via conduit 73 is employed, the need for a separate distillation zone 40 is minimized or even eliminated.

If desired, a portion of the concentrated sulfuric acid acid in conduit 38 can be passed directly to conduit 39 via conduit 38a for recycle to the process. In this event, the acid stream treated in zone 70 can be viewed as a slip stream of the concentrated acid bottoms withdrawn from concentrator 30. Generally, at least about 10 vol%, preferably from about 50 to 100 vol%, of the sulfuric acid in conduit 38 is passed to electrolysis zone 70. As before, the precise portion of the concentrated acid bottoms treated in zone 70 will depend on the amount of impurities in the concentrated acid, the desired purification level in the treated stream to be achieved and other factors.

The relative flow of liquids to zone 40, and through conduits 73 and 38a, can be controlled by means of valves 77, 71 and 37, respectively.

The conditions of electrolysis employed in zone 70 correspond to the electrolysis conditions discussed above with respect to FIG. 1. Thus, electrolysis zone 70 generally employs a temperature of from about 20° to 130° C., a pressure from about 0 to 30 psig, a current density of from about 1 to 1,000 amps per sq ft and generally achieves a treated acid stream, withdrawn via conduit 74, which contains from about 45 to 99 wt% sulfuric acid. As before, the construction of apparatus for use in the electrolysis is entirely conventional, as is the selection of appropriate voltage source 72.

The process of this invention can be further illustrated by reference to the following examples, wherein parts are by weight unless otherwise indicated.

In the examples, total soluble organic carbon (TSOC) measurements are made by employing a Beckman Total Organic Carbon Analyzer (Model 215B), using liquid samples which are first filtered by means of vacuum filtration through a funnel equipped with glass fiber filter discs (Reeve Angel 935 AH, Whatman Co.) mounted on a glass vacuum flask to remove carbonaceous solids particles having a size greater than about 1.5 microns.

Distillations of samples are accomplished in the examples by charging each sample to a 500 ml, 2-neck round bottom flask equipped with a thermometer and a 9-inch long glass cooling water condenser. The liquid is stirred by means of a magnetic stirrer and heated by means of an electric heating mantle. Distillations are effected at atmospheric pressure and at a rate such that about 0.5 ml of water is recovered as condensate per minute. The distillation is terminated when the pot temperature achieves a temperature of 178° C., which corresponds to the atmospheric boiling point of 72 wt% sulfuric acid. After cooling to room temperature, both the condensate and the liquid remaining in the flask are analyzed for TSOC. In addition, the condensate is analyzed by gas chromatography.

The heat soaking treatments in the examples are performed by charging each sample so treated to a 250 ml 2-neck round bottom glass flask equipped with a thermometer, 9-inch long glass cooling water condenser and magnetic stirring bar. The flask is heated by means of an electric heating mantle. The liquid is then distilled with stirring and with complete liquid reflux for the selected period of time, after which the liquid is analyzed for TSOC.

In Examples 1 and 2, the impure spent sulfuric acid is obtained from the hydration of n-butenes to form the corresponding alcohols.

EXAMPLE 1

To illustrate the effect of temperature on the electrolytic process of this invention, a series of runs are conducted in which 500 gram samples of a spent sulfuric acid, the selected acid strength and the indicated concentrations of total soluble organic, are charged at room temperature to a 2000 ml Pyrex beaker which is placed in a water bath equipped with a copper coil. For high temperature runs (60° C.), steam is passed through the coil at a rate such as to maintain the acid at the desired temperature. For low temperature runs (15° C.), an isopropyl alcohol/dry ice mixture is used instead of a water bath to maintain the desired temperature. Stirring is accomplished by means of a magnetic stirrer.

The electrode system consists of two platinum gauze cylinders (manufactured by Englehard) (45 mesh), each about 2 in. long, having diameters (about 1.25 in. and 1.5 in., respectively) such that one cylinder can be inserted inside the other. Physical contact of the anode and cathode is prevented by inserting a piece of coarse (2 mm, 9 mesh) polypropylene screen between the cylinders. So arranged, the cylinders are substantially axially aligned, and are kept separated at a distance of about 0.12 in. An EICO Company, Model 1065 S battery charger is employed as the power source.

The electrolysis experiments are performed by bringing the acid to the desired temperature as described above. A stream of nitrogen is then directed into the beaker to ensure that a combustible mixture of hydrogen and oxygen does not form during electrolysis in the glass vessel. Power (5 amps, 3.8 volts) is applied to the electrodes for the 15.3 hours. A current density of 160 amps per square foot is maintained during the electrolysis. Thereafter, the TSOC of the treated acid is determined.

The data thereby obtained are set forth in Table I below.

TABLE I

| Run No. | Acid Strength (Wt % $H_2SO_4$) | Electrolysis Temp °C. | Electrolysis Electrical Efficiency (%)[1] | TSOC Concentration Initial (ppm) | TSOC Concentration Final (ppm) | Carbon Removed (Grams) | Carbon Removed (Wt %) | $RSO_3H$[3] Concentration (ppm) Initial | $RSO_3H$[3] Concentration (ppm) Final | % Reduction[4] |
|---|---|---|---|---|---|---|---|---|---|---|
| 1 | 72 | 15 | 49 | 7630 | 2220 | 3.62 | 68 | 24500 | 7130 | 71 |
| 2 | 72 | 60 | 65 | 7630 | 750 | 3.44 | 90 | 24500 | 2410 | 90 |
| 3 | 45 | 15 | 50 | 7370 | 2160 | 2.67 | 72 | 23660 | 6930 | 71 |
| 4 | 45 | 60 | 57 | 7370 | 1960 | 3.03 | 82 | 23660 | 6290 | 73 |

NOTES:
[1]Electrical efficiency (%) = grams of carbon removed ÷ (2 × Faradays used); basis: [2 grams carbon removed per Faraday = 100% electrical efficiency]
[2]TSOC = total soluble organic carbon; ppm by weight
[3]$RSO_3H$; R = hydroxybutyl, ppm by weight.
[4]% $RSO_3H$ reduction calculated by difference, based on initial and final $RSO_3H$ concentrations, in ppm.

EXAMPLE 2

The electrolysis procedure of Example 1 is repeated in four separate additional runs employing the indicated acids and conditions. After completion of the electrolytic treatment, each treated acid sample is tested for its TSOC. In Runs 1 and 3, the samples are then admixed with sufficient water to dilute the acid to 45 wt % $H_2SO_4$, and the diluted samples are then distilled using the above-described procedure, thereby reconcentrating the acids to 72 wt % and providing a thermal history comparable to that of Runs 2 and 4, described below. The reconcentrated samples in Runs 1 and 3 are then passed to a separate flask wherein each is subjected to the above-described heat soaking treatment at a temperature of 178° C., for a period of 4 hours. In Runs 2 and 4, the liquids recovered from electrolysis are distilled (without prior dilution) using the above-described procedure to concentrate the samples to 72 wt % $H_2SO_4$ prior to the above heat soaking treatment. The resulting heat-treated liquids are also analyzed for TSOC.

In order to illustrate the improvement achieved by the process of this invention in lowering the amounts of carbonaceous solids formed in such impure acids, a separate series of runs is performed in which the impure concentrated sulfuric acids (72 wt % $H_2SO_4$), containing the indicated concentrations of total soluble organic carbon and organo-sulfonic acid impurities, and which have not been treated by the electrolytic method, are first diluted with sufficient water to a 42 wt % $H_2SO_4$ strength and then distilled and thereby reconcentrated to 72 wt % $H_2SO_4$, to provide a comparable thermal history to the samples of Runs 1-4. Thereafter, the reconcentrated samples are subjected to the above-described heat soaking treatment, again at 178° C. for 4 hours.

The data thereby obtained are set forth in Table II below.

sulfuric acid streams of Control Runs 5 to 10, which were not subject to the electrolytic treatment of this invention, was thermally degraded into carbonaceous solids in the heat soaking treatment. In addition, the rate of coking (i.e., the grams of carbonaceous solids formed in the heat soaking test per hour in 1,000 gms. of solution) in Runs 1-4 was also far less than the rate of coking for the heat soaked sulfuric acid streams in control Runs 5-9 which contained greater initial TSOC levels and was even less than the rate of coking for the untreated acids of Runs 6 and 7 which contained lower initial TSOC levels prior to heat soaking.

Therefore, at equivalent TSOC levels, the process of this invention, which can be used in a batchwise, semi-continuous or continuous manner, allows one to operate an olefin hydration process with less attendant coking, and hence less carbonaceous depositions to foul process equipment, than could be tolerated in the absence of acids having such improved thermal stabilities. As a consequence, the process of this invention allows operation of the olefin hydration process with "dirty acid," e.g., acids having up to about 20,000 ppm, preferably from about 500 to 1500 ppm, and more preferably from about 1000 to 10,000 ppm, of total organic carbon (calculated as elemental carbon) in the acid effluent from the electrolytic zone of this invention, without significant carbonaceous fouling problems. Therefore, the invention removes the need to treat spent sulfuric acid to remove all organic carbon to produce "white acid" in order to avoid the fouling problems as has been thought essential by the prior art.

Preferably, the acid streams treated by the process of this invention form carbonaceous solids when exposed to elevated temperatures (e.g., 150°-180° C.) at a rate which is at least about 50%, and more preferably at least about 90% less than the rate at which such solids would be formed under such conditions in the untreated acid stream.

While not critical, a liquid permeable membrane sepa-

TABLE II

| | | ELECTROLYSIS | | | | | | HEAT SOAK TREATMENT | | | | | |
|---|---|---|---|---|---|---|---|---|---|---|---|---|---|
| | Acid | Initial: | | | % Electr. | Post-Electr: | | Initial: | | Post-Treat: | | % Cok- | Rate of Cok- |
| Run No. | Wt. % $H_2SO_4$ A | TSOC[2] (ppm) B | $RSO_3H$ (ppm) C | Temp (°C.) D | Efficiency[1] E | TSOC (ppm) F | $RSO_3H$ (ppm) G | TSOC (ppm) H | $RSO_3H$ (ppm) I | TSOC (ppm) J | $RSO_3H$ (ppm) K | ing L | ing M |
| 1 | 72 | 7630 | 24500 | 15 | 49 | 2220 | 7130 | 1139 | 3660 | 881 | 2820 | 23 | 0.06 |
| 2 | 45 | 7370 | 23660 | 15 | 50 | 2160 | 6930 | 1429 | 4590 | 1318 | 4230 | 8 | 0.03 |
| 3 | 72 | 7630 | 24500 | 60 | 65 | 750 | 2410 | 610 | 1960 | 611 | 1960 | 0 | ~0 |
| 4 | 45 | 7370 | 23660 | 60 | 57 | 1960 | 6300 | 1389 | 4460 | 1225 | 3930 | 12 | 0.04 |
| 5 | 72 | — | — | — | — | — | — | 7680 | 24650 | 1828 | 5865 | 76 | 1.46 |
| 6 | 72 | — | — | — | — | — | — | 4447 | 14270 | 1698 | 5450 | 62 | 0.69 |
| 7 | 72 | — | — | — | — | — | — | 3500 | 11230 | 1446 | 4640 | 59 | 0.51 |
| 8 | 72 | — | — | — | — | — | — | 2250 | 7220 | 682 | 2190 | 70 | 0.39 |
| 9 | 72 | — | — | — | — | — | — | 900 | 2890 | 350 | 1122 | 61 | 0.14 |
| 10 | 72 | — | — | — | — | — | — | 484 | 1550 | 221 | 710 | 54 | 0.07 |

NOTES:
[1] Defined in Notes in Table 1
[2] TSOC = Total soluble organic carbon
[3] $RSO_3H$; R = hydroxybutyl, ppm by weight
[4] % coking, L = [(H − J) ÷ H] × 100]
[5] Rate of coking M [(gms/hr)/1000 gms of solution] = (H − J) ÷ 4000

As can be seen from the data reported in Table II, the electrolytic treatments of Runs 1-4 produced sulfuric acids of greatly enhanced thermal stability. Only from about 0 to about 23 wt. % of the TSOC remaining in the sulfuric acid after the electrolysis in Runs 1-4 was thermally degraded to carbonaceous solids in the subsequent heat soak treatment. By contrast, from about 54 to 76 wt. % of the TSOC present in the untreated spent rator will generally be used in the electrolysis cell to separate the anolyte from the catholyte compartments and thereby separate $H_2$ and $O_2$ gases that are evolved in the cell to minimize the explosive hazard. Any conventional membranes can be used, such as those fabricated of porous ceramics, woven fiberglass net (with open spaces about 0.5 mm×0.5 mm), ion exchange membranes, hydrophilic porous polypropylene membranes, porous polyethylene, porous PVC/vinyl acetate copolymer membranes or microporous PVC membranes. Of the above, microporous PVC membranes are preferred.

Most preferred as anodes in the practice of this invention are graphite-supported $PbO_2$ anodes manufactured by Pacific Engineering and Production Company, Henderson, Nevada. When using $PbO_2$ anodes, the temperature of electrolysis is preferably within the range of from about 50° to 130° C., and most preferably as high as possible within that range since it has been found that the rate of corrosion of $PbO_2$ anodes decreases as the temperature of electrolysis increases. Further, since it has also been found that the rate of $PbO_2$ corrosion increases with increasing $H_2SO_4$ concentrations, it is preferred to employ as dilute an acid as possible for electrolysis with these preferred anodes, all other factors being constant.

The electrolytic treatment of acids according to the process of this invention is preferably conducted for a time and under conditions sufficient to avoid substantial concentration of the sulfuric acid by removal of substantial amounts of water during the electrolysis. Most preferably, the sulfuric acid concentration across the electrolysis zone is not increased by more than 1 wt. % of the $H_2SO_4$ concentration in the acid fed to the electrolysis.

It will be obvious that various changes and modifications can be made without departing from the invention, and it is intended, therefore, that all matter contained in the foregoing description shall be interpreted as illustrative only and not as limiting the invention. For example, as an alternative embodiment to that illustrated in FIG. 2 and a preferred embodiment of this invention, a sidestream acid containing at least about 500 ppm organo-sulfuric acid impurities can be withdrawn from concentrator 30 above or below the acid feed conduit 24 and passed (instead of, or in addition to, acid in stream 38) to electrolysis zone 70 for electrolytic treatment, as described above, to electrolytically oxidize at least a portion of the organo-sulfonic acid impurities therein. The thus-treated acid stream can then be returned to concentrator 30 via conduit 73, as described above.

What is claimed is:

1. An improved process for preparing alcohols which comprises:
   (a) absorbing an olefin in an absorbing zone with an aqueous concentrated sulfuric acid solution to form an alkyl ester of the sulfuric acid corresponding to said olefin;
   (b) recovering a liquid stream from said absorbing zone containing said sulfuric acid alkyl ester and contacting said recovered liquid with water for liberation of the corresponding alcohol;
   (c) passing the resulting diluted liquid to an alcohol generation zone for recovery of said alcohol as a vaporous product, thereby forming a spent sulfuric acid stream containing from about 40 to 55 wt. % sulfuric acid and at least about 500 ppm by weight of organo-sulfuric acid impurities;
   (d) passing at least a portion of said spent acid to an electrolysis zone and subjecting the acid therein to conditions sufficient to electrolytically oxidize at least a portion of said organo-sulfonic acid impurities to form electrolysis products therefrom; and
   (e) passing the resulting electrolytically treated spent sulfuric acid, in combination with the remaining portion of the spent sulfuric acid not treated in the electrolysis zone, to an acid-concentrator wherein aqueous vapors are removed to form a concentrated sulfuric acid solution of enhanced thermal stability suitable for recycle to the absorbing zone.

2. The process of claim 1 wherein the temperature of from about 20° to 190° C. is employed in the electrolysis zone.

3. The process according to claim 1 wherein the organo-sulfonic acid impurities comprise hydroxyalkyl-sulfonic acid, alkenyl-sulfonic acid or mixtures thereof, and wherein the number of carbon atoms in the organo-moiety of the organo-sulfonic acid impurities corresponds to the number of carbon atoms in the olefin fed to the absorbing zone.

4. An improved process for preparing alcohols which comprises:
   (a) absorbing an olefin in an absorbing zone with an aqueous concentrated sulfuric acid solution to form an alkyl ester of the sulfuric acid corresponding to said olefin;
   (b) recovering a liquid stream from said absorbing zone containing said sulfuric acid alkyl ester and contacting said recovered liquid with water for liberation of the corresponding alcohol;
   (c) passing the resulting diluted liquid to an alcohol generation zone for recovery of said alcohol as a vaporous product, thereby forming a spent sulfuric acid stream;
   (d) passing said spent acid to an acid concentrator wherein the spent acid is distilled for removal of aqueous vapors to form a concentrated spent acid containing from about 45 to 99 wt. % sulfuric acid and at least about 1500 ppm by weight or organo-sulfonic acid impurities;
   (e) passing at least a portion of said concentrated spent acid to an electrolysis zone and subjecting the acid therein to conditions sufficient to electrolytically oxidize at least a portion of said organo-sulfonic acid impurities to form electrolysis products therefrom; and
   (f) subjecting at least a portion of the thus-treated sulfuric acid stream to conditions of temperature and pressure such as to volatilize and remove at least a portion of such electrolysis products which have a higher volatility than water or which co-distill therewith, to form a sulfuric acid stream of increased thermal stability suitable for recycle to said absorbing zone.

5. The process according to claim 4 wherein a temperature of from about 20° to 190° C. is employed in the electrolysis zone.

6. The process of claims 4 or 5 wherein the organo-sulfuric acid impurities comprise hydroxyalkyl-sulfonic acid, alkenyl-sulfonic acid or mixtures thereof, and wherein the number of carbon atoms in the organo-moiety of the organo-sulfonic acid impurities corresponds to the number of carbon atoms in the olefin fed to the absorbing zone.

7. An improved process for preparing alcohols which comprises:
   (a) absorbing an olefin in an absorbing zone with an aqueous concentrated sulfuric acid solution to form an alkyl ester of the sulfuric acid corresponding to said olefin;
   (b) recovering a liquid stream from said absorbing zone containing said sulfuric acid alkyl ester and contacting said recovered liquid with water for liberation of the corresponding alcohol;

(c) passing the resulting diluted liquid to an alcohol generation zone for recovery of said alcohol as a vaporous product, thereby forming a spent sulfuric acid stream;
(d) passing said spent acid to an acid concentrator wherein the spent acid is distilled for removal of aqueous vapors to form a concentrated spent acid containing from about 45 to 99 wt. % sulfuric acid;
(e) withdrawing a sulfuric acid sidestream from said acid concentrator and passing said acid sidestream to an electrolysis zone; subjecting the acid in the electrolysis zone to conditions sufficient to electrolytically oxidize at least a portion of said organosulfonic acid impurities to form electrolysis products therefrom; and
(f) recycling at least a portion of the thus-treated sulfuric acid stream from said electrolysis zone to said acid concentrator, whereby a concentrated sulfuric acid stream of increased thermal stability can be withdrawn from said acid concentrator.

* * * * *